US009056682B2

(12) United States Patent
Ehlers et al.

(10) Patent No.: US 9,056,682 B2
(45) Date of Patent: Jun. 16, 2015

(54) INTEGRATED MONUMENT

(75) Inventors: Bernd Ehlers, Hamburg (DE); Mark Herzog, Barsbüttel (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 162 days.

(21) Appl. No.: 13/244,440

(22) Filed: Sep. 24, 2011

(65) Prior Publication Data
US 2012/0012706 A1 Jan. 19, 2012

Related U.S. Application Data

(63) Continuation of application No. PCT/EP2010/052973, filed on Mar. 9, 2010.

(60) Provisional application No. 61/162,796, filed on Mar. 24, 2009.

(30) Foreign Application Priority Data

Mar. 24, 2009 (DE) .......................... 10 2009 014 601

(51) Int. Cl.
*B64D 11/00* (2006.01)
*B64D 11/04* (2006.01)
*B64D 11/02* (2006.01)

(52) U.S. Cl.
CPC .............. *B64D 11/04* (2013.01); *B64D 11/02* (2013.01); *B64D 2011/0046* (2013.01); *Y02T 50/46* (2013.01)

(58) Field of Classification Search
CPC .................. B64D 11/02; B64D 11/00; B64D 2011/0046; B64D 2011/0076

USPC ................ 244/118.5; 4/321, 323, 670; 52/34, 52/220.1, 79.1

See application file for complete search history.

(56) References Cited

U.S. PATENT DOCUMENTS

| 4,521,925 A | | 6/1985 | Chen et al. | |
|---|---|---|---|---|
| 4,574,533 A | * | 3/1986 | Bigelow et al. | ..................... 52/34 |
| 4,653,125 A | * | 3/1987 | Porter | ................................. 4/301 |

(Continued)

FOREIGN PATENT DOCUMENTS

| DE | 10308498 A1 | 9/2004 |
|---|---|---|
| DE | 10339077 A1 | 3/2005 |

(Continued)

OTHER PUBLICATIONS

International Search Report dated Jul. 1, 2010 for International Application No. PCT/EP2010/052973.

(Continued)

*Primary Examiner* — Rob Swiatek
*Assistant Examiner* — George Andonyan
(74) *Attorney, Agent, or Firm* — Ingrassia Fisher & Lorenz, P.C.

(57) ABSTRACT

A monument is provided for an aircraft. The monument includes, but is not limited to several system components with identical, substantially identical or similar functions that can be connected by way of a single system connection arrangement to the supply in the aircraft. Distribution of the supply media, received by the aircraft, to the individual system components takes place within the monument. The system connections can thus be identical to the system connections of a single monument.

5 Claims, 2 Drawing Sheets

(56) References Cited

U.S. PATENT DOCUMENTS

| | | | |
|---|---|---|---|
| 5,083,727 A * | 1/1992 | Pompei et al. | 244/118.6 |
| 5,724,773 A * | 3/1998 | Hall | 52/34 |
| 6,899,184 B2 * | 5/2005 | Reynolds | 169/62 |
| 7,152,257 B2 * | 12/2006 | Lasch et al. | 4/661 |
| 7,284,287 B2 * | 10/2007 | Cooper et al. | 4/664 |
| 7,299,511 B2 | 11/2007 | Quan | |
| 7,354,018 B2 * | 4/2008 | Saint-Jalmes | 244/118.5 |
| 7,931,047 B2 | 4/2011 | Gonnsen et al. | |
| 8,403,258 B2 * | 3/2013 | Arendt et al. | 244/53 R |
| 2004/0227034 A1 * | 11/2004 | Wentland et al. | 244/119 |
| 2005/0103935 A1 | 5/2005 | Sprenger et al. | |
| 2005/0116099 A1 * | 6/2005 | Pho et al. | 244/118.5 |
| 2006/0035518 A1 | 2/2006 | Hueber | |
| 2008/0179546 A1 | 7/2008 | Diergardt | |
| 2008/0237397 A1 * | 10/2008 | Seibt | 244/118.5 |
| 2009/0050738 A1 * | 2/2009 | Breuer et al. | 244/118.5 |
| 2010/0116935 A1 * | 5/2010 | Rieger et al. | 244/118.5 |

FOREIGN PATENT DOCUMENTS

| | | |
|---|---|---|
| DE | 102009014601 A1 | 9/2010 |
| EP | 1626470 A2 | 2/2006 |
| WO | 2006087168 A1 | 8/2006 |

OTHER PUBLICATIONS

German Office Action dated Mar. 1, 2010 for German Application No. 102009014601.6.

* cited by examiner

INTEGRATED MONUMENT

CROSS-REFERENCE TO RELATED APPLICATION

This application is a continuation of International Application No. PCT/EP2010/052973, filed Mar. 9, 2010, which was published under PCT Article 21(2) and which claims priority to German Patent Application No. 102009014601.6 filed Mar. 24, 2009 and of U.S. Provisional Patent Application No. 61/162,796 filed Mar. 24, 2009, the disclosure of which applications is hereby incorporated herein by reference.

TECHNICAL FIELD

The technical field relates to monuments in transportation means. In particular, the technical field relates to a monument for an aircraft, to the use of such a monument in an aircraft, and to an aircraft comprising such a monument.

BACKGROUND

On board a commercial aircraft of the size of the A320 there are, as a rule, three to four toilets. In order to provide end users with the option of optimizing the cabin for their purposes, a greater number of positioning spaces for toilets is provided than required. Thus, individual placement of the toilet monuments is possible to a certain extent.

As a result of the large number of possible positioning spaces and the fact that over the life of an aircraft, as a rule, it is operated by several operators and thus different cabins are configured and erected, there is a need to make provisions at the time of delivery, which provisions make it possible to erect monuments afterwards, at different positioning spaces. Such monuments are, for example, on-board toilet monuments or galley monuments. These provisions take up space, cost money, and add additional weight to the aircraft, often without ever actually being used.

DE 103 39 077 A1 and US 2005/0103935 A1 describe a passenger compartment in the cabin of a commercial aircraft with several toilet monuments. Described is a multipurpose space 1, which with minimal manipulation can be converted from a toilet space to a space with a neutral look. The cabin layout is not changed in this process.

It is at least one object to state a monument that allows increased flexibility in the cabin layout. In addition, other objects, desirable features and characteristics will become apparent from the subsequent summary and detailed description, and the appended claims, taken in conjunction with the accompanying drawings and this background.

SUMMARY

Stated are a monument for an aircraft, the use of a monument in an aircraft and an aircraft. The described exemplary embodiments relate equally to the monument, the use and the aircraft. In other words, all the characteristics mentioned below, for example with regard to the monument, can be implemented for the use or in the aircraft, and vice versa.

According to an exemplary embodiment, a monument for an aircraft is stated that comprises a first system component, a system connection arrangement and a line arrangement. The system connection arrangement is designed for connecting the first system component and a further, second, system component to a supply line of the aircraft. The line arrangement is designed for connecting the system connection arrangement to the first system component and to the second system component, wherein the first system component and the second system component are identical (in other words at least corresponding) system components. This includes also such system components that merely comprise identical or similar functions. For example, the first system component can be a toilet, and the second system component a urinal. Alternatively, the first system component is, for example, a toilet for persons with a disability, and the second system component is a standard toilet.

In other words this is a combined monument (combi monument) or an expandable monument that can be enlarged. In the case of a combi monument the monument comprises two system components, and in the case of an expandable monument it comprises at least the first system component and connections for a second system component. Both system components correspond to each other, in other words comprise identical or similar functions, but they need not be altogether identical. In each case a sole system connection arrangement is sufficient to connect both system components to the supply line of the aircraft, even if the two system components are accommodated in different sections of the monument.

According to a further exemplary embodiment, the monument is an on-board toilet monument. According to a further exemplary embodiment, the on-board toilet monument comprises two separate toilets as first and second system components. Moreover, the first system component can be a toilet or a urinal, and the second system component can be a toilet or a shower.

It is thus no longer necessary for each individual toilet to be connected separately to its own system connection arrangement. Instead, a single system connection arrangement (and corresponding supply connections in the aircraft) is sufficient for both toilets. In this manner it is possible for a single toilet monument, which is already integrated in the aircraft, by means of the toilet monument according to the invention to be exchanged for two on-board toilets, without this requiring the provision of additional system connection arrangements.

According to a further exemplary embodiment, the monument is a galley monument. For example, in this case the system components are wash basins or electrical galley appliances.

According to a further exemplary embodiment, the monument is designed to be installed in a passenger cabin of an aircraft, and, in particular, the monument is designed to replace already known standardized single monuments.

According to a further exemplary embodiment, the monument is designed as a combi module for replacing two identical single monuments. The two identical single monuments are, for example, on-board toilet monuments.

According to a further exemplary embodiment, the monument comprises a third system component in the form of a first wash basin, and a fourth system component in the form of the second wash basin. The system connection arrangement is not only used for connecting the first two system components, but also for connecting the third system component and the fourth system component to a supply line of the aircraft. The line arrangement is used for connecting the system connection arrangement to the third system component and to the fourth system component. In particular, the two sections of the monument, in which sections in each case the first or second system component is located, can differ in size.

According to a further exemplary embodiment, the monument comprises a control device that ensures that all the system components together do not request more than a predetermined maximum quantity of water per unit of time from a water supply of the aircraft (and if applicable do not have more than this supplied), so that overloading the water supply of the aircraft is prevented.

This can, for example, be an electronic control device which on the one hand measures the quantity of water which the respective users request at a given time. On the other hand, by means of suitable sensors, the electronic control system can also measure the actual rate of flow of the water through the line arrangement. Control valves can be provided in the lines, which control valves prevent or even stop the through-flow at suitable locations, if required.

Furthermore, the control device can be a purely mechanical control device which, for example, prevents water from flowing at the same time through two particular supply lines. This can, for example, take place by means of a three-way valve that is affixed to a fork of a supply line and that ensures that water can flow either into one branch or into the other branch. In this way it is possible to ensure in a simple manner that at any given time only one toilet can be flushed.

According to a further exemplary embodiment, the control device is designed to prevent concurrent flushing of the first toilet and of the second toilet.

According to a further exemplary embodiment, the monument comprises a dividing wall, wherein the first wash basin is arranged on a first side of the dividing wall and the second wash basin is arranged on a second side of the dividing wall, which side is situated opposite the first side.

According to a further exemplary embodiment, the use of a monument in an aircraft is stated, and the monument comprises the characteristics described above and below.

According to a further exemplary embodiment, the aircraft comprises, in particular, a passenger cabin and one seat rail or several seat rails. The monument is arranged in the passenger cabin and is attached to the load-bearing structure of the aircraft only at defined attachment points of a corresponding single monument and at the seat rails. In other words, by means of the monument according to the invention precisely those attachment points can be used that are also used for a single monument of the type installed in the past in aircraft.

By means of the monuments, additional monument positioning spaces and monument positioning areas can be created without it being necessary to make additional provisions for this on the aircraft side. In this arrangement, instead of a single monument (for example an on-board toilet monument) an enlarged monument is installed, which comprises two toilets and two wash basins. Moreover, it is possible to expand a base module of the monument according to the invention (which base model only comprises one toilet and one wash basin, but a corresponding line arrangement for connecting a second wash basin and a second toilet) in order to expand precisely this second toilet and the second wash basin. The expansion module with the second toilet and the second wash basin can be designed in such a manner that it comprises connections for a further expansion module so that overall three toilets with three wash basins can then be installed, without this necessitating additional supply lines on the aircraft side.

The system connections of the base monument are identical to the system connections of known single monuments.

BRIEF DESCRIPTION OF THE DRAWINGS

The present invention will hereinafter be described in conjunction with the following drawing figures, which are diagrammatic and not to scale, and where like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
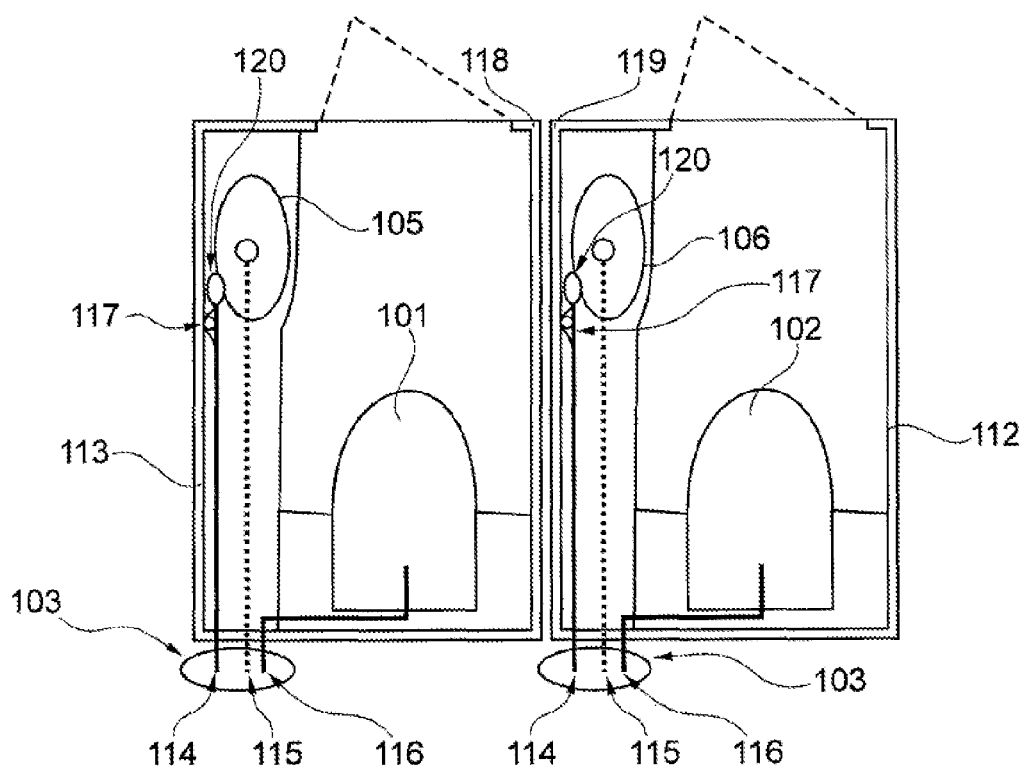
FIG. 1 shows two separate toilet monuments.

FIG. 1 shows two identical single monuments 112, 113 for an aircraft that are arranged one beside the other. Each of the two monuments comprises its own system connection arrangement 103 that is connected to a corresponding supply line of the aircraft. Thus, the supply line, too, needs to comprise two interface groups, namely one each for a system connection arrangement 103. The system connection arrangement 103 comprises a fresh water connection 114, a gray water connection 115 for removing gray water, and a black water or waste water connection 116 for removing waste water from the on-board toilet.

Each of the two monuments 112, 113 comprises its "own four walls". In particular, the separation between the two modules comprises double walls, because each of the two modules has its own outside wall 118, 119. In each module there is a wash basin 105, 106 as well as a toilet 101, 102. The fittings 120 of the wash basins are supplied with fresh water, by way of their own supply lines, by the fresh water 114. In order to heat the water, a heater 117 can be installed in the fresh water supply line.

Figure 2:
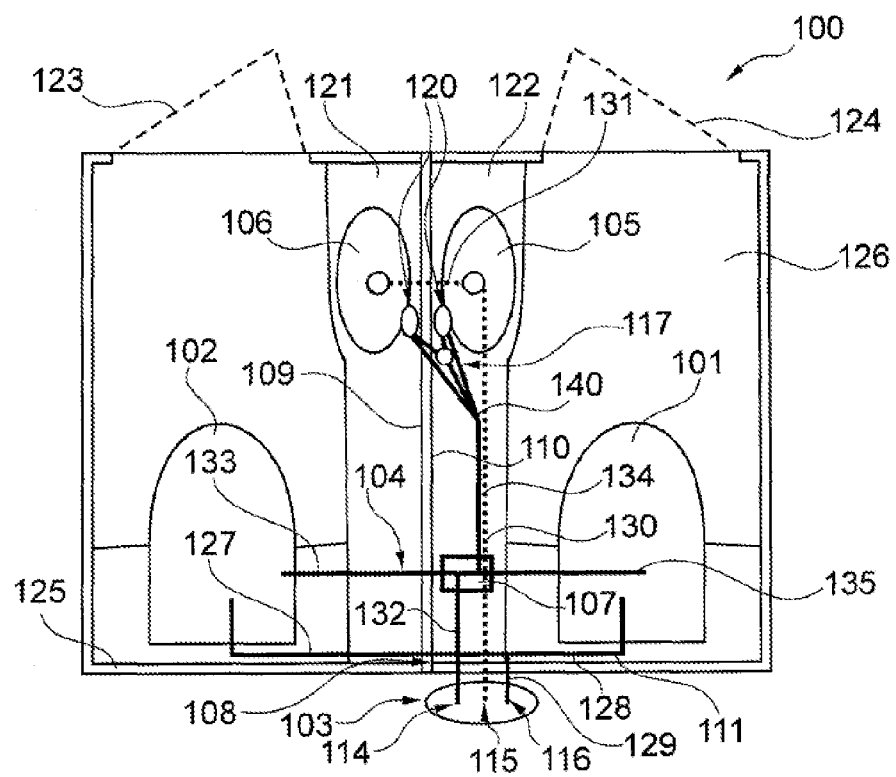
FIG. 2 shows a monument according to an exemplary embodiment.

FIG. 2 shows a monument 100 designed as a double toilet according to an exemplary embodiment. Only a single dividing wall 108 is provided for separating the two toilet regions from one another. Furthermore, the monument comprises a left-hand sidewall 123 and a right-hand sidewall 124 as well as a rear wall 125 and a ceiling 126.

The monument 100 comprises only one system connection arrangement 103, which can be connected to the supply lines integrated in the aircraft. The system connection arrangement 103 comprises, in particular, connections for fresh water 114, gray water connection 115 and black water or waste water connection 116.

The supply of fresh water 114 is connected to the first wash basin 105 and to the first toilet 101 by way of the line a (i.e., conduit or duct) arrangement 104. For this purpose a fork in the line 132 is provided, wherein the right-hand line branch 135 leads to the right-hand toilet 102, the right-hand line branch 133 leads to the left-hand toilet 101, and the upper line branch 134 leads to the wash basins.

In particular, it can be provided for the line branch 134 to supply water to both wash basins 105, 106. To this effect a trifurcation 140 is provided. The first, left-hand branch of the line arrangement extends as a cold water supply from the fork 140 to the left-hand wash basin 105 or to the fitting 120 of the left-hand wash basin 105. The right-hand branch also extends as a cold water supply to the right-hand fitting 120 of the right-hand wash basin 106. The middle branch runs through a heater 117 before forking into two further branches, wherein the left-hand branch leads to the first wash basin 105, and the right-hand branch leads to the second wash basin 106 (or to their fittings 120).

It is possible for all the lines that extend from the right-hand module half through the dividing wall 108 into the left-hand module half to comprise an interface in or on the dividing wall so that the lines of the left-hand module half can be connected in that location and can optionally be removed. In this manner it is possible to create a monument whose left-hand half can be erected or removed as required.

At the first bifurcation between the fresh water line 132 and the left-hand and right-hand branches 133 and 134 a control device 107 can be provided, for example in the form of a two-way valve or a three-way valve. This control device can control and regulate the maximum possible flow through the fresh water supply line 132. Furthermore, a line 135 can be provided, which is also connected to the first bifurcation and which can be controlled by way of the control device 107, which line 135 leads to the second toilet 102.

The control device 107 is thus able, for example, to switch between the two supply lines to the first toilet 101 and 135 to the second toilet 102, and if applicable also to switch off the supply line to the two wash basins, if required.

The two wash basins 105, 106 are integrated in corresponding wash basin surrounds 121, 122. Each of the wash basins comprises its own fitting 120. The dividing wall 108 comprises a left-hand side 109 and a right-hand side 110, wherein one wash basin 105 is arranged on the left-hand side and the other wash basin 106 is arranged on the right-hand side, where they are also attached if applicable.

Toilet waste water is fed by the disposal lines 127 (from the left-hand toilet) and 128 (from the right-hand toilet) and thereafter by way of the central line 129 and the connection 116 to the waste water removal device of the aircraft. All the waste water supply lines together are designated 111. Gray water removal by way of the left-hand wash basin takes place via the line 131 that leads through the wall 108 to the right-hand wash basin 106, and from the right-hand wash basin 106 the line 130 leads to the gray water disposal device (see connection 115).

Figure 3:
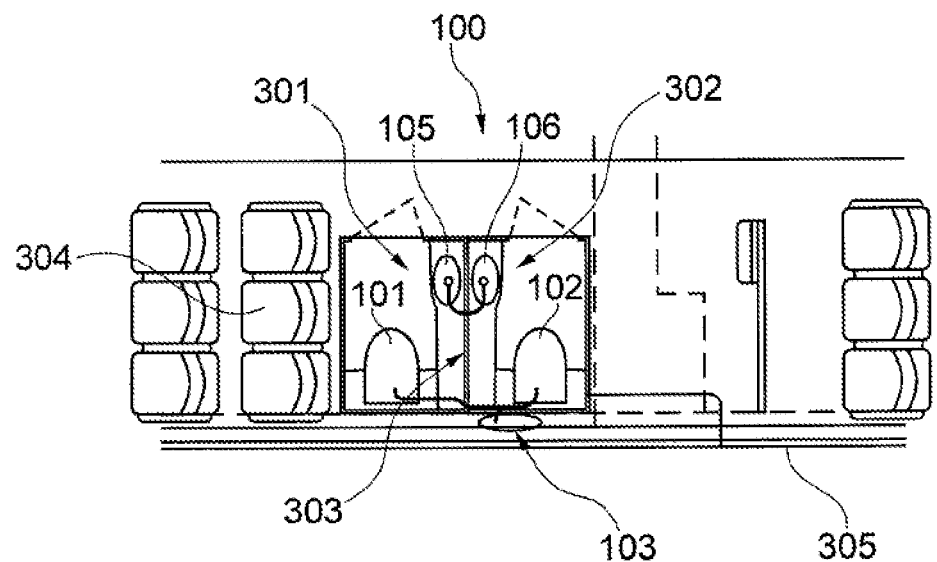
FIG. 3 shows a monument according to a further exemplary embodiment.

FIG. 3 shows an on-board toilet monument according to an exemplary embodiment of the invention. The on-board toilet monument 100 comprises a left-hand toilet cell 301 and a right-hand toilet cell 302. Each of the cells comprises it own toilet 101, 102 and its own wash basin 105, 106. The wash basins and the toilets are connected to a system connection arrangement 103 by way of corresponding line arrangements. The pipe work 303 within the monument is provided for this purpose. As shown in FIG. 3, the combi module has been erected in front of the seat row 304 at the fuselage wall 305 in the region of the exit.

Optimization of the architecture by the described integrated monuments (for example in the form of a double toilet) makes it possible to erect an additional toilet without there being a need to make additional provisions when compared to a standard toilet. All the necessary installations and provisions form part of the double monument 100. This results in a reduced number of provisions for erecting the monument, while the variety of installed parts remains the same, thus resulting in savings in weight and cost. Furthermore, there are no disadvantages to an operator wishing to install a single monument. No additional provisions for installing the double monument are required, which provisions are presently not used. In principle, the subject is a monument with two toilet cabins.

In this arrangement, in relation to one toilet the same connection philosophy applies as in relation to a single monument. The second toilet only comprises system connections within the monument and might also share the systems of the first toilet (for example the instantaneous water heater, storage compartment for paper, fire extinguishing equipment, waste water system, oxygen masks including generator, etc.).

The wash basin surrounds are, for example, opposite one another against the dividing wall 108 between the two cabins, which allow optimal dual use of the systems. Overload of the system connections is prevented by an affixed system architecture. For example, the control device 107 is provided for this purpose, which control device 107 prevents concurrent flushing of the toilets. Additional structural attachment of this double monument 100 takes place, for example, merely by way of the already present attachment points of a single monument and by way of the seat rails. Thus, retrofitting in existing aircraft layout is possible.

The number of positioning spaces to be provided for toilets can be reduced over the entire aircraft, which results in cost savings. By means of shared use of some monument components, weight savings are achieved when compared to the use of a single toilet.

Figure 4:
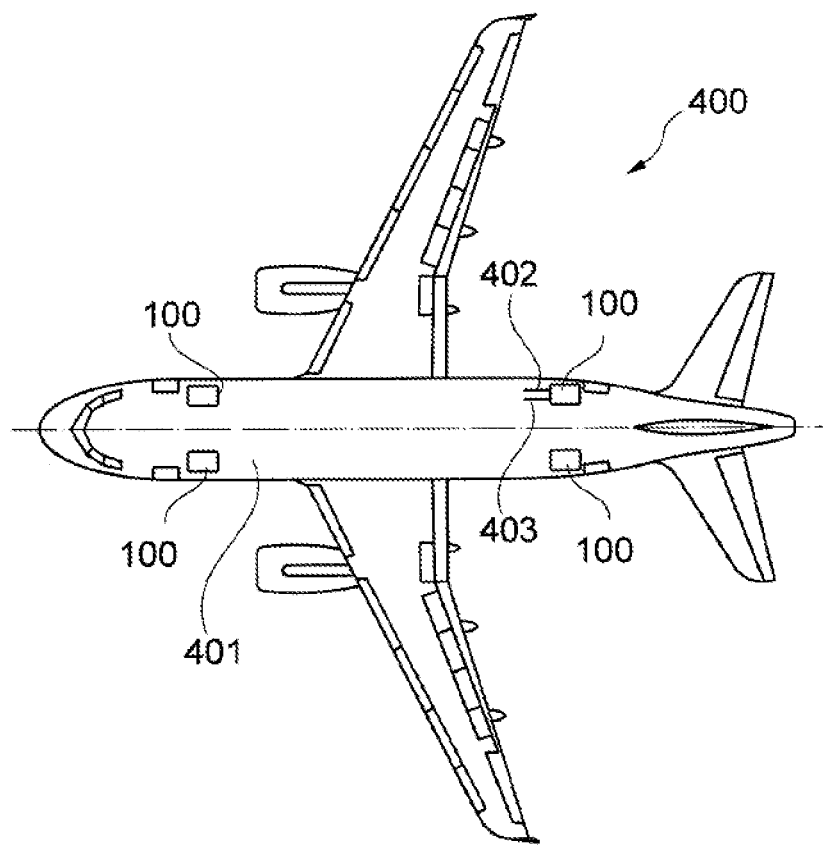
FIG. 4 shows an aircraft according to an exemplary embodiment.

FIG. 4 shows an aircraft 400. The aircraft 400 comprises a passenger cabin 401 in which a monument according to the invention is arranged at each exit. In the exemplary embodiment shown, four such monuments are provided, namely two on the starboard side of the aircraft and two on the port side. Each of these monuments can, for example, be connected to the primary structure of the aircraft by way of two or more seat rails 402, 403, or can be attached to the floor of the cabin.

Instead of toilets it is also possible to install kitchen equipment and the like in the monument, so that a modular expandable galley is provided, or an existing galley monument can be replaced by a combined, in other words enlarged, galley monument, without this requiring the use of other connections in the aircraft than is the case for the single monument.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A monument for an aircraft, comprising:
    a base module, comprising:
        a first toilet;
        a system connection arrangement including a fresh water connection; and
        a line arrangement including a first forked line and an interface;
    an expansion module comprising a second toilet, separate from the first toilet,
    a dividing wall dividing the base module and the expansion module,
    a control device wherein the control device prevents concurrent flushing of the first toilet and of the second toilet such that said first and second toilets do not request more than a predetermined maximum quantity of water per unit of time from a water supply of the aircraft;

wherein the monument is an on-board toilet monument, and wherein the monument is configured as a combi module sized to replace two substantially identical single monuments of a same volume, wherein the interface is arranged in or on the dividing wall, wherein the fresh water connection of the system connection arrangement of the base module is configured to connect the first toilet of the base module and the second toilet of the expansion module to a fresh water supply line of the aircraft via the first forked line, wherein the first forked line includes a first branch that connects the fresh water connection of the system connection arrangement to the first toilet and the first forked line includes a second branch that connects the fresh water connection of the system connection arrangement to the second toilet, and wherein the second toilet of the expansion module is connected to the second branch of the first forked line of the base module via the interface of the base module.

2. The monument of claim 1, wherein the monument is configured for installation in a passenger cabin of the aircraft.

3. The monument of claim 1, further comprising:
a third system component; and
a fourth system component,
wherein the system connection arrangement is configured to connect the third system component and the fourth system component to the fresh water supply line of the aircraft,
wherein the line arrangement is configured to connect the system connection arrangement to the third system component and to the fourth system component,
wherein the third system component is a first wash basin, and
wherein the fourth system component is a second wash basin.

4. The monument of claim 1, wherein the base module further comprises:
a second forked line; and
a waste water connection,
wherein the waste water connection of the base module is configured to connect the second forked line to a waste water line of the aircraft and the second forked line connects the waste water connection to the first toilet and to the second toilet.

5. The monument of claim 3, further comprising:
a dividing wall,
wherein the first wash basin is arranged on a first side of the dividing wall,
wherein the second wash basin is arranged on a second side of the dividing wall, and
wherein the second side is situated opposite the first side.

* * * * *